United States Patent
Savonnet et al.

(10) Patent No.: US 11,814,761 B2
(45) Date of Patent: Nov. 14, 2023

(54) PROCESS FOR PRODUCING MINERAL WOOL

(71) Applicant: SAINT-GOBAIN ISOVER, Courbevoie (FR)

(72) Inventors: Marie Savonnet, Paris (FR); Victor Maruani, Villeurbanne (FR); Eric Framery, Lyons (FR); Bruno Andrioletti, Miribel (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 827 days.

(21) Appl. No.: 16/771,354

(22) PCT Filed: Dec. 10, 2018

(86) PCT No.: PCT/FR2018/053165
§ 371 (c)(1),
(2) Date: Jun. 10, 2020

(87) PCT Pub. No.: WO2019/115920
PCT Pub. Date: Jun. 20, 2019

(65) Prior Publication Data
US 2020/0340156 A1    Oct. 29, 2020

(30) Foreign Application Priority Data
Dec. 13, 2017    (FR) ...................... 1762029

(51) Int. Cl.
| | |
|---|---|
| C03C 25/00 | (2018.01) |
| D04H 1/587 | (2012.01) |
| C03C 13/06 | (2006.01) |
| C03C 25/26 | (2018.01) |
| C03C 25/321 | (2018.01) |
| C03C 25/34 | (2006.01) |
| C09D 5/00 | (2006.01) |
| D04H 1/4218 | (2012.01) |

(52) U.S. Cl.
CPC ............. *D04H 1/587* (2013.01); *C03C 13/06* (2013.01); *C03C 25/26* (2013.01); *C03C 25/321* (2013.01); *C03C 25/34* (2013.01); *C09D 5/00* (2013.01); *D04H 1/4218* (2013.01); *C03C 2213/00* (2013.01)

(58) Field of Classification Search
CPC ............................ C03C 25/321; C03C 25/34
See application file for complete search history.

(56) References Cited

U.S. PATENT DOCUMENTS

| | | | |
|---|---|---|---|
| 2014/0353539 A1 | 12/2014 | Didier | |
| 2015/0203399 A1* | 7/2015 | Didier | F16L 59/028 |
| | | | 428/480 |

FOREIGN PATENT DOCUMENTS

| | | |
|---|---|---|
| CA | 2836902 A1 | 12/2012 |
| FR | 2985725 A1 | 7/2013 |

OTHER PUBLICATIONS

International Search Report dated Apr. 26, 2019 in PCT/FR2018/053165 filed Dec. 10, 2018 (with English translation), 5 pages.

* cited by examiner

*Primary Examiner* — Hai Y Zhang
(74) *Attorney, Agent, or Firm* — Element IP, PLC

(57) ABSTRACT

The present invention relates to a process for producing insulating products based on mineral fibers, in particular on mineral wool, comprising
  providing a first binder composition containing
    (a) from 50% to 85% by weight of water, preferably from 70 to 82% of water
    (b) from 10% to 45% by weight, preferably 15 to 35% by weight of a saccharide component containing sucrose,
    (c) from 3% to 15% by weight, preferably from 5 to 12% by weight of one or more ammonium salts or primary amine salts of an acid,
  preparing a second binder composition comprising the dilution of the first aqueous binder composition with water to a solids content of between 3 and 7% by weight,
  applying the second binder composition to mineral fibers,
  forming an assembly of mineral fibers coated with the second binder composition, and
  heating the assembly of coated mineral fibers so as to form an assembly of mineral fibers bound by an insoluble binder,
said process being characterized in that the first aqueous binder composition has a pH of less than 5.5, in that the ammonium salt or primary amine salt is a salt of strong acid or a salt of an acid having a pKa of less than or equal to 2.2, and in that the first and second binder compositions are devoid of salts of weak acids having at least a pKa of between 2.5 and 6.9.

14 Claims, No Drawings

PROCESS FOR PRODUCING MINERAL WOOL

The present application relates to a process for producing thermal insulation products based on mineral wool.

The production of insulation products based on mineral wool generally comprises a step of producing glass or rock fibers by internal or external centrifugation or by stretching, using streams of gas, molten glass emerging from a die (aeraulic process).

A relatively dilute and relatively non-viscous sizing composition is sprayed onto the still-hot fibers at the moment at which they are formed or on their path between the centrifugation device and the fiber collecting belt, generally by means of a spraying ring carrying a series of equidistant nozzles. The evaporation of the aqueous phase of the sizing composition, which occurs during and immediately after the sizing (spraying) step, leads to the formation of a relatively concentrated sizing composition layer which surrounds the fibers and makes them tacky. The sticky fibers coated with this composition are subsequently assembled on a conveyor belt into a mat of fibers. This mat retains its stickiness at least until it enters the oven in which the sizing composition undergoes a thermosetting reaction at temperatures of approximately 200° C. The final product emerging from the oven consists of mineral fibers held together by a thermoset, non-tacky organic binder.

The phenolic resins used for several decades as binders for mineral fibers, in particular for glass or rock wool, are being increasingly replaced by reagents originating from renewable sources which do not emit, or emit very little, formaldehyde, which is a compound which is considered to be potentially damaging to human health.

Numerous sugar-based binders have already been proposed.

Thus, international application WO 2007/014236 proposes binder compositions for mineral wools based on reducing sugars and on ammonium polycarboxylates (=salts of polycarboxylic acids and of primary amines or of secondary amines or of aqueous ammonia) which, by a reaction mechanism similar to the Maillard reaction, lead to the formation of binders based on complex compounds referred to as melanoidins. The aqueous binder compositions have an alkaline pH of between 7 and 10.

Application WO 2011/019590 proposes the use of an aqueous composition containing at least one amine salt of a mineral acid, including ammonium salts of mineral acid, and at least one aldehyde or a ketone, such as a reducing sugar, as binder for mineral fibers.

The applicant has shown that non-reducing sugars, such as sucrose, could also serve to prepare bio-based binder compositions.

Thus, application US 2016/264454 discloses binder compositions based on non-reducing sugars, especially on sucrose, and on ammonium salts of inorganic acids, such as ammonium sulfates, phosphates, nitrates and carbonates. The pH of the binder compositions described in this application is between 6 and 9, preferably between 7 and 8.

In the context of their research aiming to better understand the mechanism(s) of reactions of non-reducing sugars with amines, including aqueous ammonia ($NH_4OH$), the applicant surprisingly observed that, contrary to the teaching of the prior art, it is advantageous to spray binder compositions having a moderately acidic pH of approximately 5 to 6 on the mineral fibers. The applicant also observed that the reaction between sugars and amines, including the ammonium ion $NH_4^+$, led to significant acidification of the reaction medium, and that it was important to not prevent this acidification of the reaction medium by the presence of a buffer agent, such as a carboxylic acid salt, capable of buffering the reaction medium to a value of between approximately 2.5 and 7. In other words, in order to obtain thermoset products with good mechanical properties, it was important for the amine or the aqueous ammonia to be combined in the reaction medium with a strong acid or with a weak acid having a pKa of less than 2.2, and for this reaction medium to also be devoid of weak acid having a pKa of between 2.5 and 6.9.

Finally, the applicant observed that secondary and tertiary amines did not make it possible to obtain a final product having good mechanical properties and that only ammonium and primary amines reacted with the non-reducing sugars, forming a good quality set binder.

Consequently, the subject of the present invention is a process for producing insulating products based on mineral fibers, in particular on mineral wool, comprising
providing a first binder composition containing
(a) from 50% to 85% by weight of water, preferably from 70 to 82% of water
(b) from 10% to 45% by weight, preferably 15 to 35% by weight of to a saccharide component containing sucrose,
(c) from 3% to 15% by weight, preferably from 5 to 12% by weight of one or more ammonium salts ($NH_3/NH_4^+$) or primary amine salts (R—$NH_2$/R—$NH_3^+$) of an acid,
preparing a second binder composition comprising the dilution of the first is aqueous binder composition with water to a solids content of between 3 and 7% by weight, preferably between 4 and 6% by weight,
applying the second binder composition to mineral fibers,
forming an assembly of mineral fibers coated with the second binder composition, and
heating the assembly of coated mineral fibers so as to form an assembly of mineral fibers bound by an insoluble binder,
said process being characterized in that the first aqueous binder composition has a pH of less than 5.5, in that the ammonium salt or primary amine salt is a salt of strong acid or a salt of an acid having a pKa of less than or equal to 2.2, and in that the first and second binder compositions are devoid of salts of weak acids having at least a pKa of between 2.5 and 6.9.

The moderately acidic pH of between 5 and 6 of the binder composition as it is sprayed onto the mineral fibers makes it possible to protect the metal parts of the facilities against corrosion and to improve the quality of the atmosphere upstream of the oven. In the process according to the invention, the acidification of the reaction medium, which is indispensable to obtaining products having good mechanical properties, only occurs within the oven during the cross-linking reaction, that is to say in a confined atmosphere which is more readily withdrawn, neutralized and cleaned than in the open environment upstream of the oven.

In the present application, the terms "sizing composition" and "binder composition" are used as entirely equivalent terms. However, a distinction is made between a first binder composition or first sizing composition, which has a considerably greater dry matter content than the second binder composition or second sizing composition, which is much more diluted than the first.

The solids (or dry matter) content of the first binder composition is preferably between 20% and 60% by weight, in particular between 25% 55% by weight. This concentrated binder composition is intended for storage over prolonged periods, which may range for example from a few days to several weeks. It is also this binder composition which can be produced in a given location then sold and/or transported to another location with a view to the dilution thereof and application thereof to mineral fibers.

The solids (or dry matter) content of the second binder composition is between 3 and 7% by weight, preferably between 4 and 6% by weight.

The preparation of the second binder composition by dilution of the first binder composition is preferably carried out solely by the addition of water, and especially without the addition of organic solvent or any agent capable of modifying or buffering the pH of the composition. The step of preparing the second aqueous binder composition by dilution of the first binder composition therefore preferably does not comprise the addition of a base. Due to the absence of addition of a base, the second aqueous binder composition has a pH which is not very different from that of the first aqueous binder composition. The dilutions or addition of certain common additives may of course slightly increase the pH of the aqueous sizing composition, but in this case care will be taken, preferably by addition of a strong acid, to ensure that the pH of the second aqueous binder composition is less than 6.

The first and second binder compositions of the present invention therefore contain two essential ingredients which react with one another, namely a saccharide component containing sucrose, and an ammonium or primary amine salt.

These two essential ingredients advantageously represent at least 80% by weight, preferably at least 90% by weight of the dry matter of the first and second binder compositions of the invention.

Other ingredients in minor amounts, also referred to as additives, may be present. These are known additives used commonly in the field of mineral wools. These additives are chosen in particular from coupling agents, silicones and dust-preventing additives.

It is widely known and very common to use functional silanes as coupling agents for improving the adhesion of organic materials to mineral surfaces such as glass. A functional silane generally comprises at least one, preferably two or three hydrolyzable alkoxysilyl functions which are capable of reacting with the silanol groups at the surface of the glass and at least one reactive function (oxirane, amine) borne by a non-hydrolyzable organic group, bonded to the silicon atom via an Si—C bond. This organic function is generally chosen so as to be able to react with the organic phase.

In order to obtain a satisfactory binder-glass coupling effect, it is generally sufficient to add less than 1% by weight (of dry matter) of coupling agent to the sizing composition.

The most commonly used coupling agents are aminosilanes. They are relatively cheaper than epoxysilanes and have, at neutral pH, a chemical stability which makes it possible to prepare sizing compositions far in advance.

Silicones, generally polyorganosiloxanes, are used to increase the hydrophobic nature of the finished product and to improve the wet ageing thereof. Use may be made of functionalized silicones comprising groups capable of reacting with one or more reagents of the sizing composition, especially with the saccharide component. When they are present, the silicones generally represent from 0.05 to 0.2% by weight of the dry matter of the sizing composition.

Finally, the dust-preventing additives are generally aqueous emulsions of mineral oil stabilized with surfactants and/or polymers for thickening the aqueous phase. They are typically used in amounts of between 0.1 and 3.0% by weight, relative to the weight of dry matter of the sizing compositions.

The abovementioned additives are preferably added to the first aqueous binder composition during the step of preparing the second aqueous binder composition by dilution with water, in some cases immediately before application of the second composition to the mineral fibers.

The saccharide component may consist of sucrose, that is to say contain solely sucrose, or else it may contain a certain fraction of other dimeric or oligomeric saccharides, which are soluble in the sizing composition. As examples of such saccharides other than sucrose, mention may be made of maltose, lactose, maltotriose, trehalose, isotrehaloses, isosaccharoses, raffinose, erlose, umbelliferose, gentianose, melezitose, stachyose, verbascose, gentiobiose, cellobiose and water-soluble dextrins resulting from the chemical or enzymatic hydrolysis of starch and preferably having a dextrose equivalent (DE) of between 10 and 80, in particular between 15 and 70.

Sucrose preferably represents at least 50% by weight, in particular at least 80% by weight, ideally at least 95% by weight of the saccharide component.

The ammonium or primary amine salts used in the present invention are salts of strong acids or salts of weak acids having a pKa of less than 2.2. Throughout the application, pKa=$-\log_{10}$ Ka, Ka being the acid dissociation constant determined at 25° C.

Strong acids are acids which, in solution in water, dissociate entirely into proton and conjugated weak base. The pKa thereof therefore has a negative value.

As examples of these strong acids, mention may be made of hydrohalic acids, namely hydrochloric acid, hydriodic acid and hydrobromic acid, sulfuric acid ($H_2SO_4$), nitric acid ($HNO_3$), chloric acid ($HClO_3$), perchloric acid ($HClO_4$), manganic acid ($H_2MnO_4$), permanganic acid ($HMnO_4$), trifluoroacetic acid, and superacids encompassing fluoroantimonic acid ($HF \cdot SbF_5$), magic acid ($HSO_3F \cdot SbF_5$), trifluoromethanesulfonic acid ($HSO_3CF_3$), fluorosulfuric acid ($HSO_3F$) and disulfuric acid ($H_2S_2O_7$). Use may of course be made of a mixture of two or more of these strong acids.

Use may also be made of salts of weak acids having a very high dissociation constant, that is to say a very low pKa of less than 2.2, such as salts of phosphoric acid.

Use will preferably be made of salts of sulfuric acid (sulfates and hydrogensulfates), of nitric acid (nitrates) and of phosphoric acid (dihydrogenphosphates).

As explained in the introduction, the applicant has shown that, in order to obtain finished products based on mineral wool having good mechanical properties, it was important that the pH of the reaction medium be able to decrease during the crosslinking reaction down to very low values (close to 1). The sizing compositions must therefore not contain substantial amounts of weak acids having pKas of greater than 2.5, especially between 2.5 and 6.9. This category acids encompasses in particular the majority of carboxylic acids.

Of course, it is not possible to exclude the dissolution of carbon dioxide gas in the aqueous sizing compositions, leading to the presence of small amounts of carbonic acid (pKa 6.37 and 10.32). However, the buffer effect of this acid is negligible due to its low concentration and due to the fact that the pH of the first binder composition (less than 5.5) is significantly lower than the pKa of carbonic acid.

The salts of acids of use in the present invention are ammonium salts of formula $A^{n-}(NH_4^+)_n$ or primary amine salts of formula $A''^-(RNH_3^+)_n$ in which $A''^-$ represents the anion of valency n of the acid and $RNH_3^+$ represents the protonated form of the primary amine.

The primary amine, in its non-protonated form, corresponds to the following formula (I):

$$R_1—B—NH_2 \quad (I)$$

in which:
R$_1$ is equal to —H, —OH, —NHR$_2$ or —NR$_2$, in which R$_2$ is a hydrogen atom or a C$_1$-C$_5$ hydroxyalkyl group, preferably a hydroxyethyl group,
B represents
  an alkylene, arylalkylene, arylene or arlkylarylene group,
  a —CO— group or
  a group of formula:

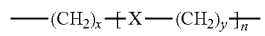

$$—(CH_2)_x—[X—(CH_2)_y]_n—$$

in which:
X represents a —O— or —NR$_3$— group, in which R is a group —H, —(CH$_2$)$_z$—NH$_2$ or a bivalent —(CH$_2$)$_t$— group which forms, with an adjacent nitrogen atom, a 6-atom ring,
x, y, z and t vary from 1 to 5, preferably x=y=z=t=2
n is equal to 1, 2, 3 or 4.

As examples of such amines, mention may be made of monoethanolamine, hexamethylenediamine (HMDA), ethylenediamine, urea, diethylenetriamine (DETA), triethylenetetramine (TETA), tetraethylenepentamine (TEPA), pentaethylenehexamine (PEHA), aminoethyltriethylenetetramine (AETETA), N"-(aminoethyl)tetraethylenepentamine and N'-(aminoethyl)tetraethylenepentamine (AETEPA), bis(piperazine)ethylene (BISPIP), aminoethylpiperazineethylethylenediamine (AEPEEDA), piperazinethyldiethylenetriamine (PEDETA), am inoethylpiperazinethyldiethylenetriamine (AEPEDETA), piperazinethyltriethylenetetramine (PETETA), tris-(aminoethyl)aminoethylpiperazine (TRISAEAEP), piperazinethylaminoethyldiethylenetriamine (PEAEDETA), polyetheramines (Jeffamines®) and tris-2-aminoethylamine.

Use will preferably be made of a primary diamine such as hexamethylenediamine and polyetheramines (Jeffamine®).

The tests and analyses performed by the applicant in order to better understand the reaction mechanisms underlying the formation of the binder have shown that at least some of the nitrogen of the ammonium or primary amine ion was found in the set binder, in a non-leachable form. In other words, the nitrogen-based reagent becomes integrated into the three-dimensional network constituting the set organic binder.

Despite the importance of the ammonium or primary amine salt for obtaining a set binder of good quality, this component is preferably a minor component relative to the saccharide component. The weight fraction of the saccharide component of the sizing composition is therefore preferably greater than that of the ammonium/primary amine salt of a strong acid.

In an advantageous embodiment of the present invention, the weight ratio of the saccharide component to the ammonium salt or primary amine salt is between 60/40 and 95/5, preferably between 65/35 and 90/10, ideally between 70/30 and 88/12.

The step of applying the second aqueous binder composition to the mineral fibers, the step of forming an assembly of tacky mineral fibers (coated with the unset binder composition), and the step of heating the assembly of mineral fibers in order to cross-link and set the tacky film surrounding the mineral fibers do not have particular technical features which are not already known from the prior art.

The curing of the binder is generally performed in a ventilated oven temperature-controlled to a temperature such that the temperature at the core of the product is between 200 and 230° C., preferably between 210° C. and 220° C. The residence time of the mat of mineral fibers in this temperature-controlled zone is preferably between 5 and 20 minutes, preferably between 7 and 15 minutes.

The examples which follow make it possible to illustrate the invention without, however, limiting it.

In these examples, the following are measured:
  the tensile strength according to standard ASTM C 686-71T, on a sample cut by stamping from the insulating product. The sample has the shape of a ring having a length of 122 mm, a width of 46 mm, a radius of curvature of the cut-out of the exterior edge equal to 38 mm and a radius of curvature of the cut-out of the interior edge equal to 12.5 mm.

The sample is positioned between two cylindrical mandrels of a testing device, one of which is movable and moves at a constant rate. The force (F) in newtons at the moment the sample breaks is measured and the tensile strength TS is calculated, defined as the ratio of the breaking force F to the weight of the sample (in newtons/gram).

The tensile strength is measured immediately after production (TS).

EXAMPLES

Concentrated compositions of binder comprising the ingredients appearing in table 1 in amounts expressed as parts by weight of dry matter are prepared. The concentrated compositions have a content of dry matter of approximately 25%, that is to say they contain approximately 75% of water. The initial pH indicated in table 1 is the pH of these concentrated compositions.

The binder compositions are prepared by introducing the constituents into a container containing water, with vigorous stirring until a homogeneous solution is formed. The initial pH indicated in table 1 is the pH of this homogeneous concentrated solution. These concentrated compositions are subsequently diluted with water to a dry matter content of 5% by weight. 8 parts of a mineral oil emulsion (dust-preventing additive), 0.5 part of aminosilane and 0.1 part of a silicone are also added thereto. It is checked that the pH of the diluted solutions is less than or equal to 6.0, and if necessary acidification is carried out by adding a strong acid. These diluted sizing compositions are used to form insulation products based on glass wool.

Glass wool is produced by the internal centrifugation technique in which the molten glass composition is converted into fibers using a tool referred to as a centrifugation plate, comprising a basket forming the chamber for receiving the molten glass composition and a peripheral strip pierced with a multitude of holes: the plate turns about its vertically arranged axis of symmetry, the composition is ejected through the holes under the effect of the centrifugal force and the material escaping through the holes is stretched into fibers with the assistance of a stream of stretching gas. The thinness of the glass fibers, measured by the value of the micronaire thereof under the conditions described in patent application FR 2 840071, is equal to 15.8 l/min. There is a correspondence relationship between the micronaire value and the mean diameter of the fibers.

A spraying ring comprising equidistant nozzles is placed below the fiberizing plate so as to regularly distribute the sizing composition over the glass wool fibers that have just been formed.

The mineral wool thus sized is collected on a belt conveyor having a width of 2.40 m, fitted with internal suction chambers which hold the mineral wool in the form of a felt or a web on the surface of the conveyor. The conveyor subsequently passes into an oven where the reagents of the binder composition (sucrose+ammonium/primary amine salt) polymerize to form a set, non-tacky, binder. The insulating product obtained has a density equal to 27.0 kg/m$^3$, a thickness of approximately 80 mm immediately after production and a loss on ignition of between approximately 3 and 5.0%.

Table 1 below shows
the chemical nature and the content by weight of the ingredients forming each sizing composition (A, B, C, D, E),
the initial pH of the concentrated aqueous sizing composition having a content of dry matter of approximately 25% by weight,
the loss on ignition of the final product, expressed as % by weight
the tensile strength (in N/g) of the final product, determined in the manner described above.

TABLE 1

| Composition | Ingredients (parts by weight) | Initial pH | pKa of the acid | Loss on ignition (%) | Tensile strength (N/g) |
|---|---|---|---|---|---|
| A* | Sucrose/ammonium sulfate (85/15) | 4.7 | 1.99 | 4.69 | 4.08 |
| B* | Sucrose/HMDA/H$_3$PO$_4$ (67.9/11.9/20.2) | 5.3 | 2.12 | 3.64 | 3.98 |
| C | Sucrose/HMDA/H$_3$PO$_4$ (75.5/13.3/11.2) | 9.1 | 2.12 | 3.93 | 3.16 |
| D | Sucrose/HMDA/H$_3$PO$_4$ (80/14/6) | 11.6 | 2.12 | 3.64 | 2.77 |
| E | Sucrose/TPA/H3PO4 (79.9/14.1/6) | 2.1 | 2.12 | 3.07 | 1.70 |
| F | Sucrose/ammonium acetate (85/15) | 8 | 4.76 | Line stoppage | Line stoppage |

*Compositions according to the invention;
HDMA = hexamethylenediamine;
TPA = tripentylamine Only the compositions A and B are compositions according to the invention, namely aqueous sizing compositions which contain sucrose and an ammonium salt (composition A) or a primary amine salt (composition B) of a strong acid (composition A) or of a weak acid having a pKa of less than 2.2, and which have an initial pH of less than 5.5.

Compositions C and D are comparative compositions because their initial pH is too high (greater than 5.5).

Composition E is a comparative composition because the amine is not a primary amine but a tertiary amine.

Composition F is a comparative composition since acetic acid is a weak acid having too high a pKa (4.76). The stoppage of the mineral wool production line was caused by the very mediocre mechanical properties of the panel formed.

The invention claimed is:
1. A process for producing insulating products based on mineral fibers, the process comprising:
    diluting a first binder composition with water, to obtain a second binder composition having a solids content of between 3 and 7% by weight,
    wherein the first binder composition comprises:
        (a) from 50% to 85% by weight of water;
        (b) from 10% to 45% by weight of a saccharide component comprising sucrose; and
        (c) from 3% to 15% by weight of one or more ammonium salts or primary amine salts of an acid;
    applying the second binder composition to mineral fibers;
    forming an assembly of mineral fibers coated with the second binder composition; and
    heating the assembly of coated mineral fibers so as to form an assembly of mineral fibers bound by an insoluble binder,
    wherein the first binder composition has a pH of less than 5.5,
    wherein the ammonium salt or primary amine salt is a salt of strong acid or a salt of an acid having a pKa of less than or equal to 2.2, and
    wherein the first and second binder compositions are devoid of salts of weak acids having at least a pKa of between 2.5 and 6.9.

2. The process as claimed in claim 1, wherein the saccharide component comprises at least 50% by weight of sucrose.

3. The process as claimed in claim 1, wherein a weight ratio of the saccharide component to the ammonium salt or primary amine salt is between 60/40 and 95/5.

4. The process as claimed in claim 1, wherein the primary amine is a primary diamine.

5. The process as claimed in claim 1, further comprising:
    adding one or more additives to the first binder composition to obtain the second binder composition.

6. The process as claimed in claim 5, wherein the additive is at least one selected from the group consisting of a coupling agent, a silicone, and a dust preventative.

7. The process as claimed in claim 1, wherein the process does not comprise adding a base to first binder composition to obtain the second binder composition.

8. The process as claimed in claim 1, wherein the second binder composition has a pH of less than 6.

9. The process as claimed in claim 1, wherein the first binder composition comprises:
    (a) from 70% to 82% by weight of water;
    (b) from 15% to 35% by weight of the saccharide component; and
    (c) from 5% to 12% by weight of the ammonium salts or the primary amine salts of an acid.

10. The process as claimed in claim 1, wherein the solid content of the second binder composition between 4 and 6% by weight.

11. The process as claimed in claim 1, wherein the saccharide component comprises at least 80% by weight of sucrose.

12. The process as claimed in claim 1, wherein the saccharide component comprises at least 95% by weight of sucrose.

13. The process as claimed in claim 1, wherein the weight ratio of the saccharide component to the ammonium salt or primary amine salt is between 65/35 and 90/10.

14. The process as claimed in claim 1, wherein the weight ratio of the saccharide component to the ammonium salt or primary amine salt is between 70/30 and 88/12.

* * * * *